United States Patent [19]

White

[11] 3,714,234
[45] Jan. 30, 1973

[54] CATALYSTS AND ESTERIFICATION PROCESS
[75] Inventor: R. Winslow White, Philadelphia, Pa.
[73] Assignee: Rohm and Haas Company, Philadelpha, Pa.
[22] Filed: July 2, 1968
[21] Appl. No.: 741,892

[52] U.S. Cl. ............260/486 R, 252/430, 260/485 R, 260/485 J, 260/485 L, 260/485 P, 260/485 G, 260/490, 260/491
[51] Int. Cl. .............................................C07c 69/54
[58] Field of Search..............................260/486, 485

[56] References Cited

UNITED STATES PATENTS 2,720,507   10/1955   Caldwell, Jr.............................260/75
3,194,791   7/1965   Wilson et al.............................260/75

FOREIGN PATENTS OR APPLICATIONS 577,788   6/1959   Canada ...............................260/475

Primary Examiner—Lorraine A. Weinberger
Assistant Examiner—Paul J. Killos
Attorney—John C. Martin, Jr., Carl A. Castellan and George W. F. Simmons

[57] ABSTRACT

Catalysts are obtained from the reaction product of (a) a tin containing compound selected from organotin compounds and inorganic tin oxides and (b) an alkali-metal alkoxide or alkali-metal phenoxide. The catalysts are useful in ester interchange reactions.

9 Claims, No Drawings

3,714,234

CATALYSTS AND ESTERIFICATION PROCESS

BACKGROUND OF THE INVENTION

Ester interchange reactions embrace reactions of an ester with another different compound, including another ester, to form a different ester than the reactant ester. The reactions include such esterification reactions commonly referred to as reesterification, transesterification and ester interchange.

Various catalysts have been used to accelerate ester interchange reactions and, in particular, metal alkoxides such as sodium methoxide are well known. U.S. Pat. Nos. such as 2,138,763, 2,744,884, 2,832,800 and 2,891,990 describe alkali-metal alkoxide catalyzed ester interchange reactions between a methacrylate ester and an alkanol. Certain organo-tin compounds useful as esterification catalysts are described in U.S. Pat. No. 3,341,570 and British Pat. No. 810,381.

Prior art attempts to prepare unsaturated esters by reactions with alcohols in basic media have been plagued with low yields caused by competing side reactions such as polymerization of the unsaturated ester and the addition reaction of the reactant alcohol with the unsaturated group of the unsaturated ester. In certain esterifications competing side reactions during purification procedures, such as distillation, are so formidable that attempts to achieve economically advantageous yields are substantially thwarted.

SUMMARY OF THE INVENTION

This invention relates to novel catalysts that are useful in esterification reactions, particularly, ester interchange reactions. The catalysts may be prepared by mixing a tin containing compound such as an organo-tin compound or an inorganic tin oxide and at least one alkali-metal alkoxide or alkali-metal phenoxide. When the catalysts of this invention are employed in ester interchange reactions, consistently high yields of the desired ester product are obtained and the reaction is substantially free of undesired side reactions. Furthermore, the desired ester product may be employed as an intermediate in further reactions without the necessity of purification by distillation. The catalysts of this invention are particularly advantageous in the ester interchange reaction of an unsaturated ester, such as an acrylate or a methacrylate, and an alcohol.

It is an object of this invention to provide new and useful catalysts. It is another object of this invention to provide a method for the catalysis of ester interchange reactions whereby such reactions produce high yields of a desired ester product that may be commercially used in the technical (i.e. undistilled) grade.

The objects of this invention may be accomplished by conducting an ester interchange reaction in the presence of a catalyst formed by the mixing of (a) a tin containing compound selected from organo-tin compounds and inorganic tin oxides and (b) an alkali-metal alkoxide or phenoxide.

DESCRIPTION OF THE INVENTION

This invention relates to novel catalysts that are useful in a process for catalytically effecting ester interchange reactions.

The novel catalyst may be described as the reaction product of (a) a tin containing compound such as an organo-tin compound or an inorganic tin oxide and (b) at least one alkali-metal alkoxide or alkali-metal phenoxide. The catalyst may be prepared by reacting (a) and (b) in any manner. Suitable alkali-metals include lithium, sodium and potassium. Sodium alkoxides, particularly sodium methoxide, are preferred. The molar ratio of the alkali-metal alkoxide or phenoxide component to the tin containing component can be between 0.2 to 2.0:1 with preferred molar ratios between 0.4 to 1.2:1.

Component (a) of the catalyst is a tin containing compound selected from organo-tin compounds and inorganic tin oxides. The organo-tin compounds contain both a tin-oxygen bond and at least one carbon-tin bond. The preferred inorganic tin oxide is stannic oxide. Since a dehydrated reaction system is preferred, hydrated tin oxides should first be dehydrated before being introduced into the reaction system with the alkali-metal alkoxide or phenoxide.

Organo-tin compounds having the formula $R_2SnO$ wherein R is an aliphatic, alicyclic or aromatic hydrocarbon group are suitable catalyst components. The aliphatic hydrocarbon group is preferably an alkyl group having one to 12 carbon atoms. The alicyclic hydrocarbon group is a cycloaliphatic group of five to seven carbon atoms. Aromatic hydrocarbon groups include phenyl and alkyl substituted phenyl wherein the total number of carbon atoms is the alkyl substituted group ranges between one to 18 carbon atoms. Representative compounds of this class include dimethyltin oxide, dipropyltin oxide, dibutyltin oxide, dioctyltin oxide, dicyclohexyltin oxide, diphenyltin oxide, dibenzyltin oxide and ditolyltin oxide. Another group of organo-tin compounds may be represented by the formula $R_3SnOH$ wherein R is as previously defined. Representative compounds of this class include trimethyltin hydroxide, triethyltin hydroxide, tripropyltin hydroxide, tributyltin hydroxide, trioctyltin hydroxide, tricyclohexyltin hydroxide, triphenyltin hydroxide, tribenzyltin hydroxide and tritolyltin hydroxide. Still other organo-tin compounds are organo-tin polymers having the repeating group

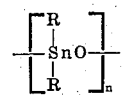

wherein R is an previously defined and $i$ is an integer greater than 1.

Other useful organo-tin compounds may be represented by the formula RSnOX wherein R is as previously defined and X represents a halogen selected from the group consisting of chlorine, bromine and iodine. Representative compounds within this class include methyltin oxychloride, propyltin oxychloride, butyltin oxychloride, butyltin oxybromide, octyltin oxychloride, octyltin oxybromide, cyclohexyltin oxychloride, phenyltin oxychloride, benzyltin oxychloride, and tolyltin oxychloride.

Generally inorganic tin oxides are preferred as the tin containing catalyst component because the catalyst will be readily removable from the reaction system by filtration, rather than by distillation. Organo-tin compounds are advantageous as catalyst components when high molecular weight esters are prepared since catalysts derived from organo-tin compounds enable the reaction to be conducted at a lower temperature.

Component (b) of the catalyst system is an alkali-metal alkoxide or phenoxide represented by the formulas:

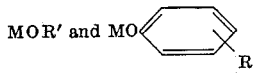

wherein R' represents alkyl of one to 12 carbon atoms, preferably one to four carbon atoms, R represents hydrogen, alkyl of one to 12 carbon atoms, preferably one to four carbon atoms, alkoxyl of one to 12 carbon atoms, amino, alkylamino of one to eight carbon atoms, phenylamino or phenyl, and M represents an alkali-metal such as lithium, sodium, and potassium.

It is preferred that the R group be in the meta or para position with respect to the MO— group and R may be positioned in both meta and para positions as long as the total carbon content previously discussed is adhered to. It is desirable to use an embodiment of R' that is the same as the alcohol moiety of the carboxylate starting material or the same as the alcohol reactant to avoid unnecessary mixtures of alcohols in the reaction mixture.

The catalyst may be introduced into the reaction system in various ways. If it is desired to prepare the catalyst system in situ, the catalyst components may be introduced individually during the reaction period and thus the catalyst is formed during the ester interchange reaction. Generally this is the simplest and preferred method. The amount of catalyst for the reaction is determined and that amount may be added as a single charge of each component or as incremental charges during the reaction period.

It may be advantageous to first mix the catalyst components in a reaction medium comprising an inert organic solvent to form a slurry containing the catalyst and then charge the catalyst to the reaction system. Preferred inert organic solvents are hydrocarbons such as benzene and toluene. Alternatively one of the reactants used to form the ester may also be employed as the reaction medium. On the other hand, it is also possible to first prepare and isolate the catalyst. The catalyst may then be charged directly to the reaction system or to one of the reactants which in turn is charged to the reaction system. The catalyst may be formed by mixing the reactants with agitation at a temperature from about 0° C. to about 150° C., preferably 20° to 80° C., for about 10 minutes to 1 hour or more.

The catalysts of this invention may be employed as ester interchange catalysts. An ester interchange reaction is a reaction between an ester and another compound, wherein the other compound may be an alcohol, an acid or another ester, to form an ester different from the starting ester. When the reaction involves an ester and an alcohol, the reaction is commonly referred to as reesterification alcoholysis. In accordance with the present invention, an organic carboxylic ester may be reacted with an alcohol to produce a different organic carboxylic ester. It is desirable to employ lower ($C_1$ to $C_4$) alkyl organic carboxylic esters such as methyl or ethyl esters since more advantageous results are obtained with these members. The propyl or butyl esters may also be employed. However, the alkyl carboxylic ester should have a lower boiling point than the desired ester product. Therefore the alcohol employed in the alcoholysis reaction will contain a greater number of carbon atoms than the alcohol moiety of the organic carboxylic ester.

Suitable organic carboxylic acid esters useful as starting materials in the ester interchange reaction are the lower alkyl esters of carboxylic acids of the formula $$R(COOH)_n$$

wherein R represents an organic radical, preferably an unsaturated organic radical, and $n$ is an integer having a value of 1 or more, generally 1 to 3. Representative carboxylic acids include aliphatic mono- or polycarboxylic acids or inner anhydrides such as acetic acrylic, methacrylic, crotonic, 4-pentenoic, 5-hexenoic, itaconic, fumaric, mesaconic and maleic anhydride.

Representative alcohols include monohydric and polyhydric alcohols which may be illustrated by the formula $R(OH)_n$ wherein R represents an organic radical and $n$ is an integer having a value of 1 or more, generally 1 to 5. The alcohol groups should be primary or secondary in order to participate in the esterification reaction. Tertiary alcohol groups should be present in the alcohol reactant but such groups will not actively participate in the reaction.

Suitable alcohols include alkanols of two to 24 carbon atoms; alkoxyalkanols in which the alkoxy part contains from one to 18 carbon atoms and the alkanol part contains two to six carbon atoms; alkenoxyalkanols in which the alkenoxy part contains two to 18 carbon atoms and the alkanol part contains two to six carbon atoms; alkenols of three to 18 carbon atoms; phenoxyalkanols in which the alkanol part contains two to six carbon atoms; alkylphenoxyalkanols in which the alkyl part contains one to 18 carbon atoms and may be embodied as one or more substituent alkyl groups and the alkanol part contains two to six carbon atoms; phenoxyalkoxyalkanols and alkylphenoxyalkoxyalkanols in which the alkanol part contains two to six carbon atoms, the alkyl part contains one to 18 carbon atoms and may be embodied as one or more substituent alkyl groups and in which the alkoxy group is either ethoxy or propoxy and there are from 1 to 50 such alkoxy groups; cycloalkanols of four to eight carbon atoms; alkylcycloalkanols in which the cycloalkanol part contains four to eight carbon atoms and the alkyl portion contains from one to 12 carbon atoms as one or more alkyl groups; phenylalkanol and alkylphenylalkanol in which the alkanol part contains one to 12 carbon atoms and the alkyl portion contains one to 12 carbon atoms as one or more alkyl substituents; alkynols of three to 18 carbon atoms; dialkylaminoalkanols in which the alkanol part contains two to six carbon atoms and the dialkyl portion contains a total of two to 16 carbon atoms; tertiary alkylaminoalkanols in which the alkanol part contains two to six carbon atoms ant the tertiary alkyl group contains four to 18 carbon atoms; sulfur containing alcohols such as thioalkanols, sulfinyl containing alkanols and sulfonyl containing alkanols; glycols and glycerols of two to 18 carbon atoms in which the hydroxyl groups are on different carbon atoms, and other polyhydric alcohols of up to 18 carbon atoms in which the hydroxy groups are on different carbon atoms.

Preferred alcohols include ethanol, butanol, hexanol, decanol, dodecanol, hexadecanol, and octadecanol, methoxyethanol, methoxybutanol, methoxydecanol, methoxyhexadecanol, ethoxyethanol, ethoxyoctanol, ethoxydodecanol, propoxypropanol, propoxyheptanol, propoxyundecanol, butoxybutanol, butoxytetradecanol, hexoxyhexanol, hexoxydodecanol, octoxynonanol, octoxydecanol, nonoxynonanol, decoxybutanol, dodecoxyhexanol, benzyl alcohol, phenylethanol, phenylbutanol, phenyldecanol, phenyldodecanol, methylphenylmethanol, butylphenyloctanol, dibutylphenylethanol, octylphenylethanol, nonylphenylpropanol, cyclohexanol, butylcyclohexanol, octylcyclohexanol, propylcycloheptanol, phenoxytriethoxyethanol, phenoxytripropoxypropanol, butylphenoxyethoxyethanol, octylphenoxyethoxyethanol, ethylene glycol, diethylene glycol, hexamethylene glycol, decamethylene glycol, octadecamethylene glycol, phenoxyethanol, phenoxybutanol, butylphenoxypentanol, octylphenoxyethanol, ethylphenoxyhexanol, propenol, hexenol, octenol, decenol, dodecenol, octadecenol, vinoxyethanol, vinoxyhexanol, propenoxybutanol, butenoxyoctanol, butenoxyhexanol, octenoxybutanol, dodecenoxyethanol, octadecenoxyethanol, propynol, butynol, hexynol, dodecynol, dimethylaminoethanol, diethylaminoethanol, dibutylaminohexanol, dioctylaminobutanol, t-butylaminoethanol, t-octylaminobutanol, t-dodecylaminobutanol, t-octyldecylaminoethanol, ethylthioethanol, ethylsulfinylethanol, ethylsulfonylethanol, glycerol and pentaerythritol.

In the ester interchange reaction it is preferred to employ the ester reactant in an amount of about 1.1 mols to 8 moles, preferably 1.5 to about 3 moles or more, per hydroxy group in the alcohol. Such a range of proportions facilitates separation of the desired ester product. Theoretically, to produce an ester, 1 mole of a monohydric alcohol is required for each mole of a monocarboxylic acid. When a polyfunctional reactant is employed, a molar increase in the monofunctional reactant corresponding to the number of functional groups in the polyfunctional reactant must be employed to obtain a theoretically complete reaction. The degree of completion and completion ratio are improved by the presence of a molar excess of one or the other of the reactants over the theoretical amount needed for the complete conversion.

The amount of catalyst employed can be varied over a wide range from 0.01 percent to 10.0 percent, said percentage being based on the theoretical weight of the reactant alcohol; preferred catalyst concentrations can be between 0.5 to 5 mole per cent, based on the weight of the reactant alcohol. The catalyst may be added as a single charge or added continuously during the course of the reaction or added incrementally during the reaction.

The ester interchange reaction is conducted in a temperature range of about 60° C. to about 150° C., preferably 70° to 110° C. The reaction is advantageously conducted at the azeotropic distillation temperature of the starting ester reactant and the liberated alcohol. Reduced pressures may be used in order to avoid excessively high pot temperatures during the removal of the azeotropic distillate. The function of the reaction temperature is to increase the rate of reaction and, in general, the temperature depends upon the boiling point of the chosen reactants. The high molecular weight alcohols and acids react more slowly and high reaction temperatures are desired to increase the reaction rate. The reaction temperature must be sufficiently high to remove the alcohol of esterification, but not so high that the starting materials are removed. The reaction time is usually between 0.5 and 24 hours or more depending on the particular reactants and the degree of completion desired. It is preferable to conduct the ester interchange reaction in the substantial absence of water since water reacts with the alkali-metal alkoxide or phenoxide and thereby impairs the efficiency of the reaction. However, if the presence of some water is desired, then an additional amount of catalyst must be added to accommodate the water. Therefore it can be readily observed that it is beneficial to conduct the reaction in the presence of a minimum amount of water.

When the desired ester product is an unsaturated carboxylate, it is desirable to conduct the esterification reaction in the presence of a free-radical polymerization inhibitor, which is added in the usual amounts. Many such inhibitors are known and available. Typical inhibitors which may be mentioned by way of example are hydroquinone, di-β-naphthol, diphenylphenylene diamine, p-hydroxydiphenylamine, phenothiazine, and the like.

The following examples are illustrative of typical procedures for performing the process of this invention. Parts are by weight unless otherwise stated.

EXAMPLE 1

Preparation of Ethylthioethyl Methacrylate

Into a 2-liter flask equipped with stirrer, thermometer, and distilling column with fractionating head, 530 g. of (5 mol.) of ethylthioethanol, 900 g. (9 mol.) of methyl methacrylate, 7.5 g. (0.05 mol.) of stannic oxide, and 1 g. of dinaphthyl phenylene diamine (polymerization inhibitor) were charged. The reaction mixture was heated to reflux at 200 mm. pressure. Then 23 g. of distillate were removed to insure elimination of water from the system. Then 3 g. of a 25 percent solution of sodium methoxide in methanol was added and distillate collected for 105 minutes at 33°–35° C. (200 mm.) until 4.8 mol. of methanol was collected as the methanol-methyl methacrylate azeotrope. During this period an additional 3 g. of the sodium methoxide mixture was added. The mixture was purified by vacuum distillation to yield first the excess of methyl methacrylate followed by 790 g. (91 percent) of purified ethylthioethyl methacrylate, b.p. 114°–115° C. (10 mm.).

EXAMPLE 2

Preparation of 2-Ethylhexyl Methacrylate

To a reaction flask fitted with a 15-plate Oldershaw column and automatic still head the following materials were charged: 650 g. (5 mol.) of 2-ethylhexanol, 900 g. (9 mol.) of methyl methacrylate, 7.5 g. (0.05 mol.) of stannic oxide, and 1 g. of 4-methoxyphenol (polymerization inhibitor). The mixture was heated to reflux at 200 mm. pressure using a slight air bleed and 9 g. of distillate were removed. Then 10 g. of a 25 percent solution of sodium methoxide in methanol was added and during the next 4 hours an additional 4 g. of sodium methoxide solution was charged to the system. During this period 5 mol. of methanol was removed as the methanol-methyl methacrylate azeotrope, b.p. 34°–35 C. (200 mm.). The excess methyl methacrylate was removed by distillation at 40°–50° C. (50 mm.) and the catalyst was removed by filtration to yield an essentially quantitative yield of 2-ethylhexyl methacrylate, which was about 98 percent pure by GLC analysis.

EXAMPLE 3

Preparation of Butyl Acrylate

To a reaction flask equipped with an automatic still head and an efficient fractionating column, 370 g. (5 mol.) of butanol, 774 g. (9 mol.) of methyl acrylate, 7.5 g. (0.05 mol.) of stannic oxide and 1 g. of dinaphthyl phenylene diamine were charged. The mixture was heated to reflux at 200 mm. and 15 g. of methyl acrylate was removed to insure dryness. Then 2 g. of a 25 percent solution of sodium methoxide in methanol was added and during the next 6 hours 4.9 mol. of methanol as its azeotrope with methyl acrylate was removed. An additional 3 g. of sodium methoxide solution was added during the reaction period. The excess methyl acrylate was removed by vacuum distillation, and the product, butyl acrylate (575 g., 90 percent), was distilled at 58°–60 C. (40 mm.).

EXAMPLE 4

Preparation of 2-Dimethylaminoethyl Methacrylate

To a reaction flask fitted with a 15-plate Oldershaw column and an automatic distilling head the following materials were charged: 2670 g. (30 mol.) of 2-dimethylaminoethanol, 5,700 g. (57 mol.) of methyl methacrylate, 45 g. (0.3 mol.) of stannic oxide, and 12 g. of 4-methoxyphenol. Complete removal of water was insured by distilling 46 g. of methyl methacrylate at 200 mm. using a slight air bleed. Then 18 g. of a 25 percent solution of sodium methoxide in methanol was added and during the next 6 hours an additional 12 g. of solution was charged to the system. During this reaction stage 928 g. (29 mol.) of methanol as its azeotrope with methyl methacrylate was removed. Excess methyl methacrylate was eliminated by distillation at 40°–50° C. (50 mm.) and the catalyst removed by filtration to yield a nearly water-white product which was analyzed by gas chromatography as 6 percent methyl methacrylate, 91 percent 2-dimethylaminoethyl methacrylate and 3 percent by-products.

EXAMPLE 5

Preparation of Ethylthioethyl Methacrylate

To 530 g. (5 moles) of ethylthioethanol, 15 g. (0.1 mole) of stannic oxide and 21.6 g. (0.1 mole) of a 25 percent solution of sodium methoxide were added. This mixture was stirred for 0.5 hour at ambient temperatures, then 900 g. (9 mole) of methyl methacrylate and 1 g. of dinaphthyl phenylene diamine were charged. The reaction was carried out by the procedure of Example 1, except that no additional sodium methoxide was added. By distillation of the finished reaction 770 g. (88.5 percent) of purified product was obtained.

EXAMPLE 6

Preparation of 2-Ethylhexyl Methacrylate

Following the procedure of Example 2, 650 g. (5 mole) of 2-ethylhexanol, 900 g. (9 mole) of methyl methacrylate, 7.5 g. (0.05 mole) of stannic oxide, 2.7 g. (0.05 mole) of sodium methoxide, and 1 g. of p-methoxyphenol were charged to the reaction flask. The reaction was carried out with no additional catalyst to yield essential completion conversion to 2-ethylhexyl methacrylate in 3.25 hours.

EXAMPLE 7

Preparation of 2-Ethylhexyl Acetate

To a reaction flask fitted with an efficient fractionating column the following materials were charged: 880 g. (10 moles) of ethyl acetate, 650 g. (5 moles) of 2-ethylhexanol, 15 g. (0.1 mole) of stannic oxide, and 5.4 g. (0.1 mole) of sodium methoxide. The mixture was heated to reflux and the ethanol/ethyl acetate azeotrope was collected until 4.7 mole of ethanol had been evolved. The excess ethyl acetate was first removed by a rapid distillation and then was collected 740 g. (85 percent) of pure 2-ethylhexyl acetate.

EXAMPLE 8

Preparation of Stearyl Acetate

Following the method of Example 7, a mixture of 740 g. (10 mole) of methyl acetate, 1350 g. (5 mole) of stearyl methacrylate, 15 g. (0.1 mole) of stannic oxide, and 21.6 g. (0.1 mole) of a 25 percent solution of sodium methoxide were heated until 4.85 moles of methanol was collected as the methanolmethyl acetate azeotrope. The excess methyl acetate was stripped away, and the catalyst mixture was removed by filtration to yield an essentially quantitative amount of stearyl acetate.

Although the ester interchange process of this invention is particularly advantageous when the product ester is an unsaturated carboxylic ester, the invention may also be practiced successfully when the resultant ester is a saturated carboxylic ester.

The carboxylic esters prepared by the ester interchange process of this invention are well known chemical materials. The unsaturated carboxylic esters are valuable as monomers for the production of useful polymers and copolymers and these polymeric products are suitable for the production of additives to lubricating oils, flocculants, floor polish compositions and paper coating formulations as well as many other uses.

I claim:

1. In the process of conducting an ester interchange reaction between a reactant alcohol having two to 24 carbon atoms and a carboxylic acid ester of an alcohol having one to four carbon atoms, the alcohol having a greater number of carbon atoms than the alcohol moiety of the carboxylic acid ester, the ester to alcohol ratio being in the range of 1.1:1 to 8:1 on a molar basis, and the temperature being 60° to 150° C., the improvement which comprises incorporating with the reactants a catalytic amount of the reaction product of (a) an inorganic tin oxide and (b) an alkali-metal alkoxide or an alkali-metal phenoxide.

2. A process according to claim 1 wherein said carboxylic acid ester is an ester of an acid selected from acetic, acrylic, methacrylic, crotonic, 4-pentenoic, 5-hexanoic, itaconic, fumaric, mesaconic, and maleic anhydride.

3. A process according to claim 2 wherein said ester is methyl methacrylate.

4. A process according to claim 3 wherein said alcohol is 2-ethylhexanol.

5. A process according to claim 3 wherein said alcohol is 2-dimethylaminoethanol.

6. A process according to claim 3 wherein said alcohol is 2-t-butylaminoethanol.

7. The process of claim 3 in which the alcohol is selected from the group consisting of 2-dimethylaminoethanol and 2-t-butylaminoethanol, and the alkali-metal compound is an alkoxide.

8. The process according to claim 7 wherein said alkali-metal compound is sodium methoxide.

9. The process according to claim 8 wherein said tin compound is stannic oxide.

* * * * *

UNITED STATES PATENT OFFICE
CERTIFICATE OF CORRECTION

Patent No. 3,714,234    Dated January 30, 1973

Inventor(s) R. Winslow White

It is certified that error appears in the above-identified patent and that said Letters Patent are hereby corrected as shown below:

Column 2, line 52, "i" should be --n--.

Signed and sealed this 4th day of March 1975.

(SEAL)
Attest:

RUTH C. MASON
Attesting Officer

C. MARSHALL DANN
Commissioner of Patents
and Trademarks